US 6,594,947 B2

(12) United States Patent
Lingren et al.

(10) Patent No.: US 6,594,947 B2
(45) Date of Patent: Jul. 22, 2003

(54) MULTI-COMPONENT DEVICE FOR CAPTURING OR REPELLING INSECTS OR INSECT PESTS

(75) Inventors: Bill W. Lingren, Carmel Valley, CA (US); Don H. Lenker, Salinas, CA (US)

(73) Assignee: Trece, Inc., Salinas, CA (US)

( * ) Notice: Subject to any disclaimer, the term of this patent is extended or adjusted under 35 U.S.C. 154(b) by 0 days.

(21) Appl. No.: 09/982,412

(22) Filed: Oct. 17, 2001

(65) Prior Publication Data

US 2003/0070347 A1 Apr. 17, 2003

(51) Int. Cl.[7] .................................................. A01M 1/14
(52) U.S. Cl. ......................................................... 43/114
(58) Field of Search ............................................ 43/114

(56) References Cited

U.S. PATENT DOCUMENTS

| | | | | | |
|---|---|---|---|---|---|
| 3,708,908 A | * | 1/1973 | Levey | ........................ | 229/109 |
| 3,729,858 A | * | 5/1973 | Bradshaw | .................... | 43/114 |
| 4,044,495 A | * | 8/1977 | Nishimura et al. | ........... | 43/114 |
| 4,161,079 A | * | 7/1979 | Hill | ............................. | 43/114 |
| 4,244,134 A | * | 1/1981 | Otterson | ...................... | 43/114 |
| 4,385,465 A | * | 5/1983 | Palmeri | ....................... | 43/114 |
| 4,709,504 A | * | 12/1987 | Andric | ......................... | 43/114 |
| 5,588,250 A | * | 12/1996 | Chiba et al. | .................. | 43/114 |
| 5,815,981 A | * | 10/1998 | Dowling et al. | .............. | 43/114 |
| 5,915,948 A | * | 6/1999 | Kunze et al. | ................. | 43/113 |
| 6,327,811 B1 | * | 12/2001 | Yamaguchi et al. | .......... | 43/107 |

* cited by examiner

*Primary Examiner*—Charles T. Jordan
*Assistant Examiner*—Bret Hayes
(74) *Attorney, Agent, or Firm*—Hana Verny (57) ABSTRACT

A three-dimensional collapsible multi-component device and assembly. The device comprises a mountable housing for mounting under a shelf, or a wall or the like in an unobtrusive or discreet manner. The housing has a first flat configuration for transportation and storage and a second three-dimensional configuration for device deployment. The device housing further includes an insert having an adhesive surface and a dispenser comprising pheromone, kairomone or other attractant, lure or bait, or, alternatively, a repellant or a combination of any of these. The adhesive is effective for trapping multiple orders of insects. A plurality of attractants, etc., is simultaneously used for attracting multiple orders of insects. The insert is selectable, removable and replaceable.

12 Claims, 4 Drawing Sheets

MULTI-COMPONENT DEVICE FOR CAPTURING OR REPELLING INSECTS OR INSECT PESTS

BACKGROUND OF THE INVENTION

1. Field of the Invention

This invention concerns a mounting multi-component device for capturing or repelling insects or insect pests. In particular, the invention concerns the mounting device comprising a mountable housing for an insert comprising an adhesive surface and a dispenser for controlled release of one or several insect attractants or repellants. The insert comprising the attractant serves as a trap for capturing and monitoring insects. The insert comprising the repellant serves as a reservoir for the repellant. The insert adhesive surface serves as a capturing means for insects or insect pests. The dispenser serves as a reservoir, protectant and rate controlling release means for active compounds. The active compounds are attractants such as pheromones, kairomones, allomones, feeding stimulants to attract the insects, insecticides to kill the insects or insect repellants to repel the insects. The device is particularly useful for capturing and monitoring insects of multiple Orders and insects of multiple species. In its simplest embodiment, the invention provides a mounting folding insect trap and assembly for capturing and monitoring insects.

2. Background of the Invention

Standard traps for attracting and trapping insects tend to be traps for capture of single insect species, visible and obtrusive. Attracting, capturing and monitoring with such traps typically require that they be placed in a visible location. Further, such traps are designed for trapping insects of a single species or, at most, of a single order (families or species of insects that are closely related). The typical systems employ one dispenser for each pheromone or other active compound. In some cases the pheromone or other active compound is capable of attracting more than one species that are closely related within an insect family, but not between insect orders such as, for example, moths of the order Lepidoptera and beetles of the order Coleoptera. Also in some cases more than one dispenser is used in a trap. However such multiple dispensers are used for species within an order of insects. Thus, the existing disposable traps are not particularly economical in use particularly where multiple orders of insects are targeted in one product or one site.

Additionally, the existing insect traps are typically three-dimensional non-collapsible structures which require a space and are clearly visible upon placement. Under certain circumstances, it is not economical to provide the space for the trap among other products or not desirable to have such a trap visible, for example, to customers in a store. Packaging and storing of the traps also present a problem.

It would, therefore, be desirable to provide a collapsible device, suitable as an insect trap, with a mounting means permitting the device to be discretely or unobtrusively mounted under a shelf on a wall, behind the counter or in a similar discrete manner. It would also be desirable to provide such a discrete device that may be easily monitored. It would also be desirable to provide such a trap that is economical by allowing at least a portion of the trap to be reused. It would further be desirable to provide a mountable device that does not require dismounting of the housing to replace the insert comprising a dispenser for bait, lure, or insecticide and adhesive sticky surface when the insert is no longer functional or otherwise needs replacement. It would also be desirable to provide a multi-use device assembly where the attractant may be selected for a plurality of target insect or insect pests. It would also be desirable to provide such a device or assembly that may be used simultaneously for several insect orders using different attractants formulated for incorporation into one dispenser emplaced within one device unit. It would also be desirable to provide a device, such as an insect trap that utilizes a surface covered with adhesive formulation for capture of insect or insect pests. Further, it would be desirable to provide a device that reduces space requirements and labor costs generated from storing, placing, collecting and evaluating the inserts serving as the traps.

All patents, patent applications and publications cited herein are hereby incorporated by reference.

SUMMARY

One aspect of the current invention is a multi-component device for capturing or repelling insects or insect pests.

Another aspect of the current invention is a mountable device comprising an external housing, an insert internally positioned within said housing, said insert further comprising an adhesive surface for capturing and monitoring captured insects, a porous removable and replaceable dispenser and active compound holding reservoir, said dispenser or reservoir protecting said active compound from external conditions and releasing said active compound at a controlled release rate.

Still another aspect of the current invention is a chemically neutral, porous dispenser for holding and releasing an active compound or a mixture of two or more active compounds at a predetermined controlled release rate, wherein said dispenser is made of plastic, rubber, polymer, elastomer, wood, felt, starch, cellulose or cellulose derivative, alginate, film, oil or hard fat or, in alternative, the adhesive surface of the insert functions as a dispenser when it is coated with an active compound or a mixture of two or more active compounds formulated to release the active compound at controlled release rate.

Still yet another aspect of the current invention is a multi-lure incorporated into one dispenser, wherein said multi-lure comprises two or more active compound, selected from attractants, such as pheromones, kairomones or allomones, or feeding stimulants or insecticides or repellants, alone or in combination with each other, said active compound being a ketone, aldehyde, acetate, alcohol or ester formulated and incorporated into said dispenser for controlled release rate.

Yet another aspect of the current invention is a multi-lure formulated for attracting and capturing multiple insect orders and species and incorporated into a dispenser for controlled release rate.

BRIEF DESCRIPTION OF DRAWINGS

FIG. 3 is a side-elevational view of the trap housing of a preferred embodiment of the invention in a position to be attached under a shelf or the like.

DEFINITIONS

As used herein:

"Multi-component device" means a device consisting of a mountable housing, an insert comprising a surface, said surface covered with an adhesive for capture or for attracting and capture of the insect or insect pest, or with a repellant for repelling the insect or insect pest, one or several dispensers serving as a reservoir for the attractant or repellant and controlling a release rate of said attractant or repellant, wherein the adhesive surface could also function as a dispenser.

"Attractant" means any compound which attracts insect or insect pests, such as, for example, pheromones, kairomones, allomones, feeding stimulants or combination thereof, etc.

"Insecticides" means any compound which kills the insect or insect pests.

"Repellant" means any compound which repels the insect or insect pests.

"Insect trap" is a multi-component device, as defined above, wherein the insert's surface is covered with an adhesive for capturing the insect attracted into the interior of the insert by the attractant, as defined above. In this application, the multi-component device and the insect trap are used interchangeably.

"Adhesive" means any compound or material suitable which is sticky to which the insect will adhere. Non-limiting examples are a glue, starch, honey, pectin, gluten, scotch tapes, and such others.

"Substrate" or "substrate material" means material used for fabrication of the housing, insert or dispenser.

"Active compound" or "active component" is any attractant such as a pheromone, kairomone, allomone or a feeding stimulant, feeding stimulant, bait, lure, or repellant, or insecticide for killing insects.

"Bait" means a composition comprising an active compound which is or which is in a mixture with a feeding stimulant.

"Lure" means a composition comprising an active compound which is or which is in a mixture with an attractant.

DETAILED DESCRIPTION OF THE INVENTION

The present invention provides a new and improved three-dimensional multi-component collapsible device and assembly suitable for use as an insect trap or an insect repellant device. The device comprises several novel features making it extraordinarily practical and effective.

The device of the invention comprises a collapsible carton or plastic container that when deployed includes a separate inner portion, an adhesive insert, having a surface covered with a adhesive surface, such as glue, or with a repellant compound, and a dispenser incorporated with a pheromone, kairomone or other attractant, lure or bait, or, alternatively, a repellant or insecticide. In one embodiment, the attractant or combination of attractants is directed to multiple orders of insects, e.g., to Lepidoptera and Coleoptera, that is to moths and beetles, Biptera, Hymenoptera, Siphonaptera, Hemiptera, Colembola and certain Arachnoidea. Another embodiment may provide an adhesive that attracts and captures multiple orders of insects and still another embodiment may provide a repellant or mixture of repellants to repel one or more insects.

I. Functional Features of the Multi-component Device

Functional features of the multi-functional device are described as particular embodiments.

In one particular embodiment, the device housing comprises a wall mounting feature to mount the trap under a shelf, counter, on a wall or the like, in an unobtrusive or discrete manner. The mounting means may be an adhesive, or other temporary or permanent attachment means such as plastic or metal hooks, tacks, nails, etc. Thus, the device may be placed so that it is concealed and is not generally visible.

In a preferred embodiment, the device comprises an external housing and an insert internally positioned within said housing comprised of an adhesive surface and a porous dispenser reservoir for active compound. According to this embodiment the housing is a container for receiving and holding the insert containing the adhesive surface, attractant, repellant or insecticide, etc. Preferably, the insert is a removable, replaceable unit of which the adhesive surface, dispensers and active compound may be selected depending upon desired use of the trap. The insert may be removed to monitor the efficiency and then be returned into position for further use, or it may be replaced with another insert.

The housing has a first flat configuration for transportation and storage, and a second three-dimensional configuration for trap deployment. The housing is easily assembled into a three-dimensional configuration that is opened for use, i.e., to hold the insert. The insert is typically, but not limited to, a collapsible carton, film, milk carton stock or plastic. The insert is also collapsed for shipping and assembled for use. The insert may be selected from a variety of inserts containing different adhesives, different dispensers containing different attractant or combinations of attractants, and/or repellents, insecticides or other trapping mechanisms depending on the desired use of the trap.

The insert may be removed when replacement is desired while leaving the housing mounted in place. Thus, the insert provides a more economical and convenient trap arrangement that permits the housing to remain in place in a relatively permanent location while the insert can be replaced when the trap is full, the adhesive or glue has dried, the lure containing the pheromone, attractant or insecticide is no longer effective or where the insects to be trapped is different. The insert also allows monitoring of the concealed trap without requiring removal of the housing. The insert may be removed, checked and then returned to the trap housing, or if appropriate, replaced.

The device housing and insert, typically collapsed for shipping and storing, is easily assembled into a three-dimensional device. The insert is easily inserted therein into the housing and exchanged for a replacement insert. Upon assembling, the assembled housing and insert become a unit which has an outer side exposed externally to an environment and an inner portion forming a cavity for capture of insects. The outer side of the unit is preferably coated with a protective agent or esthetically pleasing coating. The inner side of the housing is covered with a smooth, preferably plastic, coating to permit easy sliding of insert therein to the external side of the insert. The inner side of the insert surface is coated with an adhesive and/or insect attractant or repellent, if the adhesive also functions as a dispenser. In assembled form, the housing and insert both have openings on two, three or four sides to permit entry of the insect lured by the internally placed attractant or bait and capturing of the insect with adhesive coating. The unit is protected from dust by a closed side of the housing which when mounted on a wall faces upward or vertically along the wall. The insert provides a dispenser holder or, optionally, a plurality of dispenser holders for placing selected lures depending on the desired use of the trap. For example, the insert may provide tabs, holes, slits or other openings or holding devices for holding the dispenser such as rubber septa, polymer stoppers or cellulose strips, wooden structure, or other types or shapes of dispensers containing the active compound, etc. The material of the dispenser and choice of the active compound(s) is predetermined to provide desired and controlled release rate. In alternative, the adhesive surface may contain the adhesive and/or active compounds and become the dispenser.

For storage and shipping, the trap is manufactured from a flat substrate such as, for example, milk carton stock, plastic, film or cardboard. The adhesives are applied to the internal surface of the insert and a removable peelable paper, film, plastic, etc., is applied to the adhesive to protect it until assembly and deployment.

The outer side of the insert is coated with a protective agent such as polyethylene, plastic, wax or any other suitable protective means. The other, internal side, is coated with an adhesive agent, such as, glue, sticky substances, waxes, oils, oil mixtures or any other adherent which permits the insects to be caught. In addition to the adhesive, the internal surface also may be coated with an insect attractant, feeding stimulant or a combination of attractants, such as a pheromone, kairomone, food attractant, fragrance or the like, or with an insecticide for killing the insects, although these active components are typically incorporated into the dispenser attached to or inserted into the device insert. Each coating may be applied individually or in combination with any other coating.

To convert the collapsed unit into the three-dimensional unit comprising the housing and insert, the collapsed unit is folded along its folding lines. The housing is folded so that the mounts are formed as a flat surface, typically a strip, to be placed on the wall or other mounting surface while the housing extends away from the wall or mounting surface to form a three-dimensional housing. Similarly, the insert is folded to provide a three dimensional inner space for receiving and capturing the insects and to provide an outer configuration that fits within the housing so that openings in the housing and the insert for receiving insects are substantially aligned to permit ingress of the insects. After assembling the insert and placing the dispensers on tabs that are folded into the internal space of the insert or positioning them into openings or in the holders, the insert is locked in a closed position.

The device is attached to the wall, under the shelf or counter or elsewhere with insert in place, with exposed adhesive surface and with the dispenser in place, is now in functional state. The attractant, lure or bait emanates from the dispenser in a controlled release rate attracting the insects or insect pests into the device, that is, into the insert interior, where the insect or insect pest is captured by adhesion to the sticky surface. After the adhesive is full or after all attractant is released from the dispenser, the insert is removed and the new or cleaned insert is emplaced. The use of the holding is thus unlimited and is also versatile as different inserts with different lures may be used for different insect capture, as needs arise.

II. Structural Features of Multi-component Device

The structural features of the multi-component device for capturing insects and insect pests are illustrated in FIGS. 1–6. The device of the invention described herein is called trap for trapping and capturing insects. However, the same device is useful for repelling the insect entry.

FIGS. 1–6 illustrate the device of the present invention comprising a housing 10 and an insert 40 that is inserted into the housing 10 when the device is deployed. The device or trap housing 10 is constructed primarily from a single flat substrate, such as a polyethylene coated cardboard or plastic, and with folds and slits formed in the substrate material so that it can be assembled into a three-dimensional structure for containing the insert 40. Similarly, the trap insert 40 is constructed primarily of a single flat material with folds and slits allowing it to be assembled into a three-dimensional structure that can be inserted into the trap housing 10.

Figure 3:
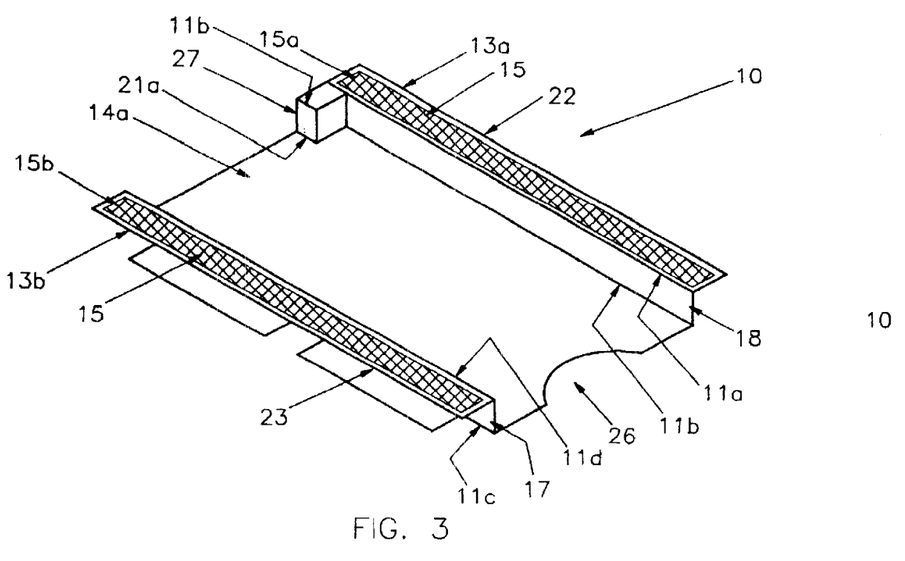
Figure 4:
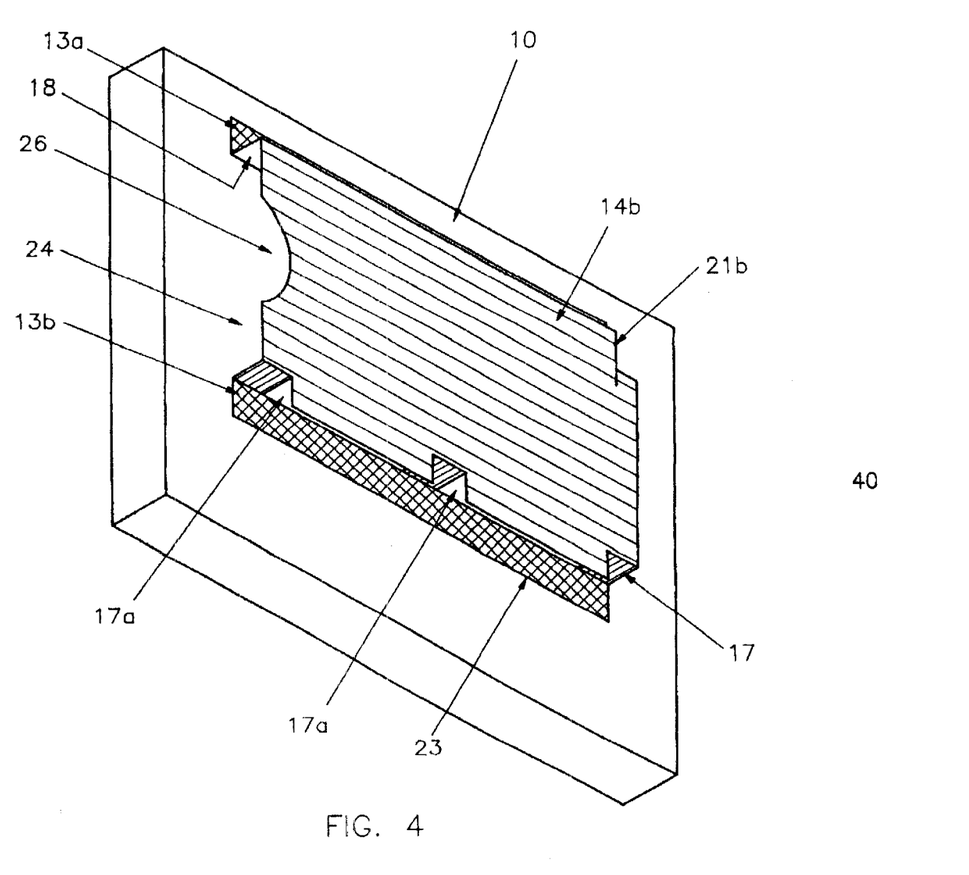
FIG. 4 is a side-elevational view of the trap housing of FIG. 3 in a position attached to the side of a wall.
Figure 5:
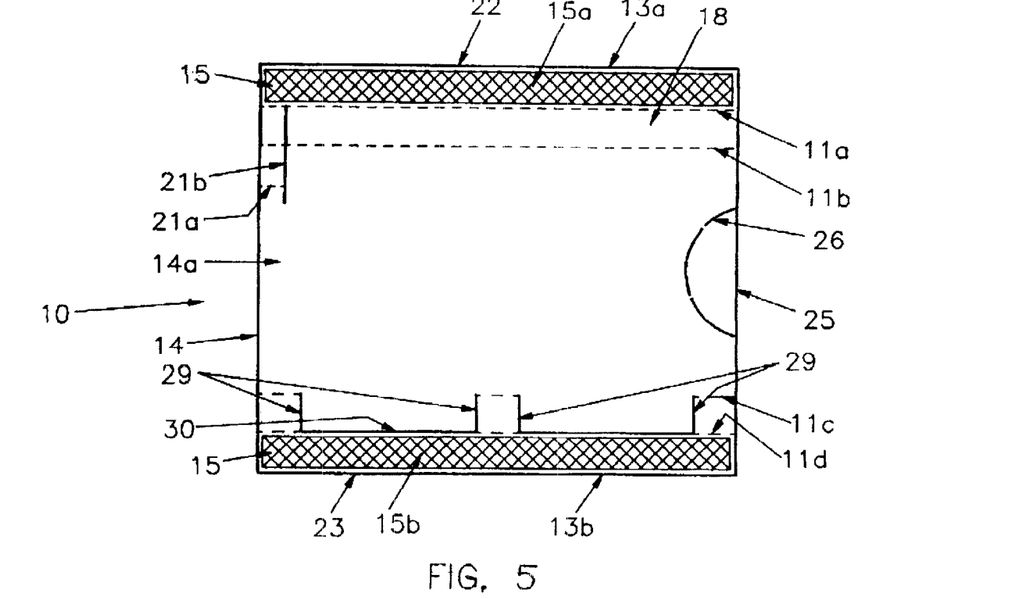
FIG. 5 is top view of the trap housing of FIGS. 3 and 4 in an unassembled position.

FIGS. 3–5 illustrate the trap housing 10 of the present invention. As shown in FIG. 5, for purposes of storage and transport, the trap housing 10 is flat prior to trap assembly and deployment. The trap housing 10 includes a panel 14 having an inner side 14a and an outer side 14b. The inner side 14a holds the trap insert 40 when the trap is deployed. A portion of the outer side 14b is closed to exclude dust from the trap. Fold lines 11a, 11b are formed along the panel 14 such that when folded, they form a closed side 18 and tab 13a. Fold lines 11c, 11d are formed along the panel 14 substantially parallel to fold lines 11a, 11b such that when folded, they form an open side 17 and tab 13b. Tabs 13a and 13b have adhesive areas 15a and 15b respectively on the inner side 14a of the panel 14 for mounting the trap on a surface such as under a shelf or on a wall. Removable cover paper or other covering material 15 is placed over the adhesive areas 15a, 15b for transportation and storage until the trap housing 10 is ready to be mounted for use. Slits 29 are made between and perpendicular to fold lines 11c, 11d along with slits 30 along fold line 11d to provide openings 17a (FIG. 4) in the open side 17 (FIG. 4) of the trap housing 10 when it is assembled. The openings 17a permit the insects to enter into the trap housing 10 and trap insert 40 as described below.

The trap housing 10 further comprises a tear piece 25 to be removed from the assembled housing 10 (FIG. 3) to provide a slit 26 for easy grasping of a trap insert 40 when it is inserted into the housing 10.

The trap housing 10 is preferably stored and transported in its flat, two-dimensional configuration shown in FIG. 5. The housing can be made of any material that can be easily cut and bent and will not crack. One suitable material is, for example, 0.024 thick fiberboard coated with polyethylene. Other materials include milk carton stock, plastic sheet, plastic film or vinyl sheet material may also be used in transportation.

When the trap housing 10 is to be deployed, the panel 14 is folded at the fold lines 11a, 11b, 11c and 11d in a manner as illustrated in FIG. 3 to form its three-dimensional configuration with sides 17, 18 and tabs 13a, 13b. Fold lines 11a, 11b form side 17 between the fold lines and tab 13a extending from fold line 11a to the edge 22 of the substrate panel 14. Similarly, fold lines 11c, 11d form side 18 between fold lines 11c, lid and tab 13b extending from the fold line 11d to the side edge 23 of ihe substrate panel 14.

FIG. 3 illustrates the orientation of the trap housing when it is placed under a shelf or the like. The inner side 14a including the adhesive areas 15a, 15b of the tabs 13a, 13b face upward so that the inner side 14a forms a shelf to hold the trap insert 40. The sides 17 and 18 are substantially perpendicular to the tabs 13a and 13b, respectively, and to the inner side 14a. The release paper 15 is removed from the tabs 13a 13b to expose the adhesive areas 15a, 15b for mounting on the under surface of a shelf. Thus, the trap housing 10 may be placed in an unobtrusive or hidden location.

The trap housing 10 further comprises fold line 21a and slit 21b that permit a detent 27 to be folded into the inside of the trap housing 10. The detent 27 prevents the trap insert 40 from sliding out or passing through the trap housing 10 in a direction past the detent 27. The detent 27 also prevents improper insertion of the-trap insert 40 through the wrong side. The trap insert 40, as described below, is inserted and removed through the opening in the side 24 of the trap housing 10 adjacent the slit 26. When the trap housing 10 is attached under a shelf (FIG. 3), the panel 14 holds and supports the trap insert 40. When the trap housing is attached to a wall (FIG. 4) it is preferably attached so that the side 18 is facing upward to prevent dust from entering into the trap. Accordingly, the insert 40 is held in place or supported by side 17 and prevented from sliding out by the detent 27, when applied to a wall, the openings 17a are thus located on the bottom side permitting the insects to enter the trap.

Figure 1:
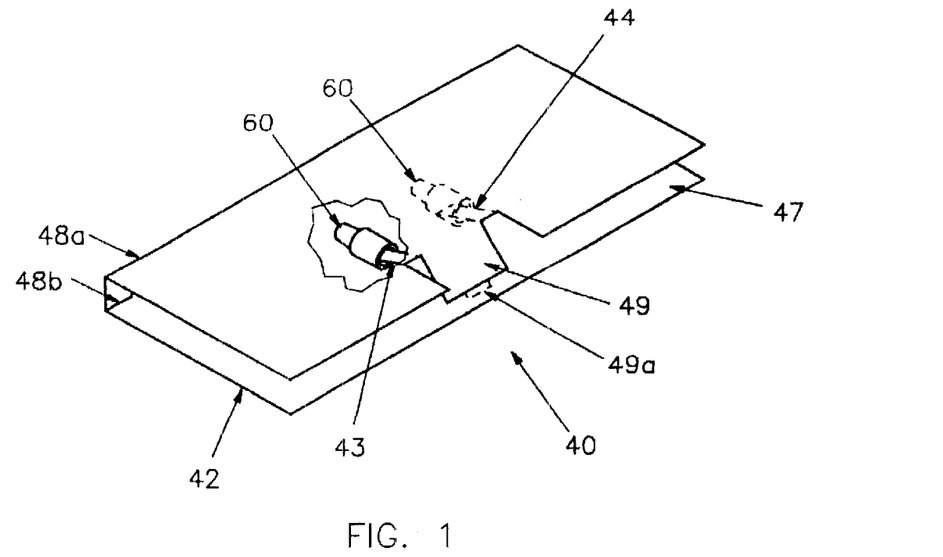
FIG. 1 is a back-side elevational view with a partial cutaway of a trap insert of the trap of a preferred embodiment of the invention.
Figure 2:
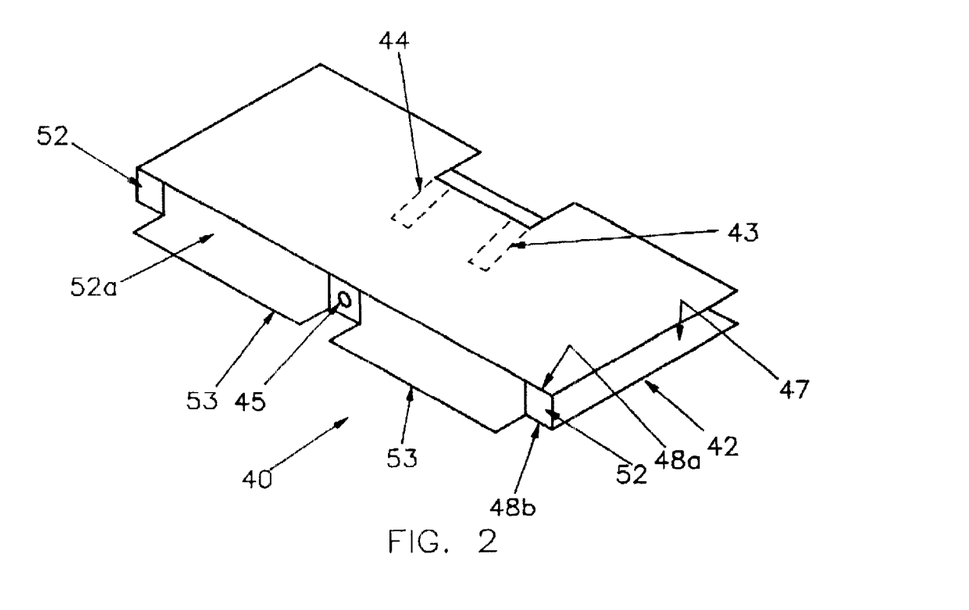
FIG. 2 is a front-side elevational view of the trap insert of FIG. 1.
Figure 6:
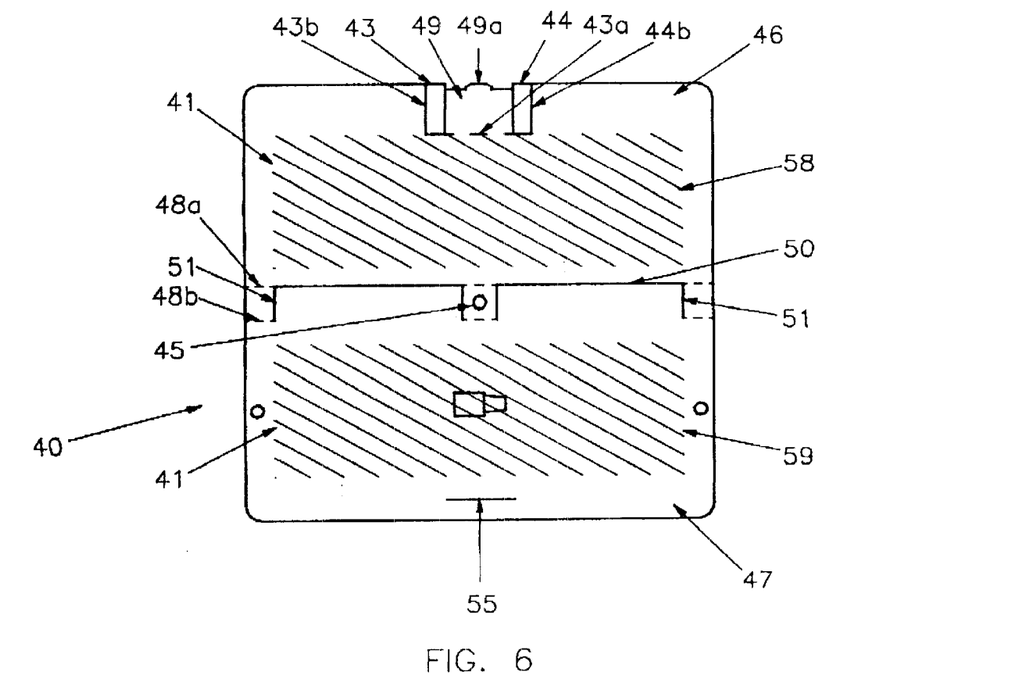
FIG. 6 is a top view of the trap insert of FIGS. 1 and 2 in an unassembled position.

The trap insert 40 of the preferred embodiment is preferably formed of a single substrate such as a polymer coated cardboard piece (FIG. 6). Fold lines and slits are formed in the substrate so that the insect may be assembled and inserted into the trap housing 10. The substrate includes adhesive areas 58 and 59 located on upper and lower panels 46 and 47 of the top insert 40. The adhesive areas 58 and 59 have permanently applied adhesive covered with a cover, such as paper 41. The trap insert 40 includes fold lines 48a, 48b slits 50 along fold line 48, and slits 51 perpendicular to and extending between fold lines 48a and 48b. When assembled as shown in FIGS. 1 and 2, the substrate is folded along fold lines 48a and 48b to form vented side wall 52. The slits 50, 51 form the vents 52a in the side wall 52 and tabs 53 forming extensions to panel 47. Fold line 43a and slits 43b form tab 43 on the top of the assembled trap insert 40. Similarly, fold 43a and slits 44b form tab 44 on top of the assembled trap insert. Tabs 43 and 44 may be folded back, into the trap insert as illustrated in FIGS. 1 and 2. The tabs 43, 44 are used to hold a dispenser 60 containing e.g. a chemical attractant. The dispenser 60 is inserted over the tabs 43, 44 and placed within the trap insert, preferably so that the attached dispenser 60 are positioned in or close to the adhesive areas 58 and 59. A plurality of tabs may be provided so that different dispensers having different attractants to target different insects or insect orders, may be simultaneously used. The dispenser 60 may be constructed of rubber, butadiene based product, cellulose, polymer, elastomer, or a similar material, with a chemical attractant or combination of attractants absorbed into the material of the dispenser. The dispenser 60 each include an opening (not shown) for receiving one of the tabs 43, 44.

When folded back, tabs 43, 44 form tab 49 having an end 49a shaped to fit within slit 55 on the opposite side of the substrate when the insert is folded. Thus the tab 49 serves to lock the insert 40 in a folded configuration.

A hole or multiplicity of holes 45 are formed in side wall 52 to alternatively receive an attractant dispenser. Attractants or attractant dispensers may also be placed directly onto glue areas 58 and 59.

To use, the trap insert 40 is assembled by folding along fold lines 48a, 48b so that the inner sides 46, 47 face one another. The slits 50 and 51 allow tabs 53 to be formed so that the extend from the side wall 52 of the insert 40 and to provide openings or vents 52a for the insects to enter the insert 40. The cover material 41 is removed from the adhesive areas 58 and 59. Thus, the adhesive surfaces 58 and 59 are exposed to capture insects entering the trap. The dispenser 60 is placed in the proper location and the trap insert 40 is folded with the end 49a of the locking tab 49 placed through slit 55 to lock the insert 40 in its deployed position.

As an alternative, a dispenser 60 or some other device serving as a dispenser containing an attractant may be placed in the adhesive area 58 or 59 as illustrated in FIG. 6, then the dimensions of the insert 40 must be such as to clamp the dispenser 60 slightly when the insert 40 is closed and locked.

In use, after the trip housing 10 is mounted in place under shelf or on a wall, the assembled insert 40 is placed in the housing 10 through the end with the slit 26 formed by removing the tear piece 25. The detent 27 provides a stop to correctly locate the insert 40 in the housing 10. If the housing 10 is on the wall, bottom side 42 of the insert is preferably placed against the wall and the edge 53 is preferably facing downward. If the housing 10 is placed underneath a shelf (FIG. 3), side 42 is preferably up and the edge 53 is against the closed side 18 of the housing.

The small flat shape permits the trap to be placed in tight spaces such as under shelves or in cabinets.

III. Capturing and Monitoring the Insect or Insect Pest

The device may be provided with means for monitoring and for mass trapping. The internal surface of the trap may be divided into grids or other geometric patterns permitting evaluating and monitoring a number of captured insects.

Preferably, targeted insects are pests of two different insect orders. For example, two insects attacking stored products, tobacco moth or cigarette beetle, are targeted in areas of tobacco processing, storage and transportation. In preferred embodiments, the traps may be used for monitoring and capturing of insects in homes, plants, museums, transportation, etc.

A preferred embodiment of the invention provides a trap that targets both insects of the order Lepidoptera (moths) and insects of the order Coleoptera (beetles).

Non-limiting examples of targeted insects of the order Lepidoptera may include tobacco moth (*Ephestia elutella*), indianmeal moth (*Plodia interpunctella*), Mediterranean flour moth (*Ephestia kuehniella*), almond moth (*Cadra cautella*), raisin moth (*Cadra figulilella*), or angoumois grain moth (*Sitotroga cerealella*).

Examples of targeted insects of the order Coleoptera may include cigarette beetle (*Lasioderma serricorne*), warehouse beetles (*Trogoderma glabrum*), khapre beetle (*Trogoderma grararium*) and other dermestids, flour beetles (*Triboliuni conftistim* and *Tribolium castaneum*), lesser grain borer (*Rhyzopertha dominica*), or sawtoothed grain beetle (*Oryzaephilus surinaniensis*).

A preferred attractant or attractant combination for tobacco products may include, for example, pheromones for *Ephestia elutella, Lasioderma serricorne, Plodia interpunctella,* etc.

Other insect orders which may be advantageously targeted are Biptera, Hymenoptera, Siphonabtera, Hemiptera, Colembola and certain Arachnoidea.

A preferred adhesive or trapping means may include, for example, glue, starch, pectin, gluten, thermoplastic rubber based adhesive, including mixtures of hydroxy terminated poly-iso-butylene, styrene butadine rubber, plasticiser, etc.

The adhesive or a mixture thereof must be tested to demonstrate its reliability for multi-order capture.

IV. Dispensers and Lures

Indivisible part of the invention are dispensers incorporated with one or, preferably, multiple luring and baiting compounds, or for repellant use, with an appropriate repellant.

The dispenser was described above. It is to be understood, however, that the above-described structure of the dispenser is not limiting and that any structure, shape, size, etc., may equally serve as a dispenser for an attractant or a repellant as long as such dispensers is advantageously incorporated with the attractant or repellant, as long as it provides for controlled release rate of said attractant or repellant by virtue of its material, and as long as such dispenser is placed into or mounted on the insert of the multi-component device.

The dispenser is made of a neutral material, that is the material which does not interfere with the active compound. It may be made of rubber, polymer, elastomer, wood, felt, cloth, starch, cellulose, cellulose derivative, film, alginate, oil or hard fat, among others, or the respective combination of one or several of these materials suitable to achieve desirable controlled release rate of the active component.

Preferably the dispenser is incorporated with a mixture of active components which are attracts for one or, most preferably, two insect orders and/or two insect species. Such combination of attractants for two different insect orders are not known.

Attractants or lures for the insect are, for example, specific species pheromones, kairomones, feeding stimulants, allomones, baits, etc. However, a combination of these attractants with insecticide for higher capture and killing is also encompassed. For insect repelling, the attractant is substituted with the appropriate species repellant to protect the area from the insect.

One or two attractants, repellants, insecticides, or mixtures thereof are all incorporated into selected dispenser. One or more dispensers may be used for one trap.

The dispenser serves as a reservoir and protectant for the active compound against, for example, deactivation by oxygen, other chemicals, sunlight, high or low temperature, etc., or against early and fast evaporation as these compounds are typically chemical compounds, such as ketones, aldehydes, acetates, alcohols or esters.

Typically, one dispenser will release, in a controlled release rate, the active compounds in 10–12 and up to about 24 weeks.

The combination of the dispenser and the active compound(s) incorporated therein permits a capture of multiple insects of two different insect species and, particularly, insect or different order.

V. Insects and Insect Pests

The invention is useful for the capture of insects, such as non-limiting examples of targeted insects of the order Lepidoptera including tobacco moth (*Ephestia elutella*), indianmeal moth (*Plodia interpunctella*), Mediterranean flour moth (*Ephestia kuehniella*), almond moth (*Cadra cautella*), raisin moth (*Cadra figulilella*), or angoumois grain moth (*Sitotroga cerealella*). Examples of targeted insects of the order Coleoptera may include cigarette beetle (*Lasioderma serricorne*), warehouse beetles (*Trogoderma glabrum*), khapre beetle (*Trogoderma grararium*) and other dermestids, flour beetles (*Triboliuni confiistim* and *Tribolium castaneum*), lesser grain borer (*Rhyzopertha dominica*), or sawtoothed grain beetle (*Oryzaephilus surinaniensis*). The invention is also useful for capture of Biptera, Hymenoptera, Siphonabtera, Hemiptera, Colembola and certain Arachnoidea.

The invention is also useful for capture or repelling of insect pests of order Arachnoidea, particularly various spiders as well as cockroaches, and other pests and insects, such as, ants, fireants, flies, wasps, yellow jackets, etc.

VI. Pheromones and Insecticides

Pheromones and insecticides suitable to be used as an active compound in the current invention are selected from the following groups.

Pheromone is selected from (Z)-5-decenyl acetate, dodecanyl acetate, (Z)-7-dodecenyl acetate, (E)-7-dodecenyl acetate, (Z)-8-dodecenyl acetate, (E)-8-dodecenyl acetate, (Z)-9-dodecenyl acetate, (E)-9-dodecenyl acetate, (E)-10-dodecenyl dodecenyl acetate, 11-dodecenyl acetate, (Z)-9,11-dodecadienyl acetate, (E)-9,11-dodecadienyl acetate, (Z)-11-tridecenyl acetate, (E)-11-tridecenyl acetate, tetradecanyl acetate, (E)-7-tetradecenyl acetate, (Z)-8-tetradecenyl acetate, (E)-8-tetradecenyl acetate, (Z)-9-tetradecenyl acetate, (E)-9-tetradecenyl acetate, (Z)-10-tetradecenyl acetate, (E)-10-tetradecenyl acetate, (Z)-11-tetradecenyl acetate, (E)-11-tetradecenyl acetate, (Z)-12-pentadecenyl acetate, (E)-12-pentadecenyl acetate, hexadecanyl acetate, (Z)-7-hexadecenyl acetate, (Z)-1-hexadecenyl acetate, (E)-1-hexadecenyl acetate, octadecanyl acetate, (E,Z)-7,9-dodecadienyl acetate, (Z,E)-7,9-dodecadienyl acetate, (E,E)-7,9-dodecadienyl acetate, (Z,Z)-7,9-dodecadienyl acetate, (E,E)-8,10-dodecadienyl acetate, (E,Z)-9,12-dodecadienyl acetate, (E,Z)-4,7-tridecadienyl acetate, (E,E)-9,11-tetradecadienyl acetate, (Z,Z)-9,12-tetradecadienyl acetate, (Z,Z)-7,11-hexadecadienyl acetate, (E,Z)-7,11-hexadecadienyl acetate, (Z,E)-7,11-hexadecadienyl acetate, (E,E)-7,11-hexadecadienyl acetate, (Z,E)-3,13-octadecadienyl acetate, (E,Z)-3,13-octadecadienyl acetate, (E,E)-3,13-octadecadienyl acetate, decanol, (Z)-6-nonenol, (E)-6-nonenol, dodecanol, (Z)-5-decenol, 11-dodecenol, (Z)-7-dodecenol, (E)-7-dodecenol, (Z)-8-dodecenol, (E)-8-dodecenol, (E)-9-dodecenol, (Z)-9-dodecenol, (E)-9,11-dodecadienol, (Z)-9,11-dodecadienol, (Z,E)-5,7-dodecadienol, (E,E)-5,7-dodecadienol, (E,E)-8,10-dodecadienol, (E,Z)-8,10-dodecadienol, (Z,Z)-8,10-dodecadienol, (Z,E)-8,10-dodecadienol, (E,Z)-7,9-dodecadienol, (Z,Z)-7,9-dodecadienol, (E)-5-tetradecenol, (Z)-8-tetradecenol, (Z)-9-tetradecenol, (E)-9-tetradecenol, (Z)-10-tetradecenol, (Z)-11-tetradecenol, (E)-11-tetradecenol, (Z)-11-hexadecenol, (Z,E)-9,11-tetradecadienol, (Z,E)-9,12-tetradecadienol, (Z,Z)-9,12-tetradecadienol, (Z,Z)-10,12-tetradecadienol, (Z,Z)-7,11-hexadecadienol, (Z,E)-7,11-hexadecadienol, (E)-14-methyl-8-hexadecen-1-ol, (Z)-14-methyl-8-hexadecen-1-ol, (E,E)-10,12-hexadecadienol, (E,Z)-10,12-hexadecadienol, dodecanal, (Z)-9-dodecanal, tetradecanal, (Z)-7-tetradecenal, (Z)-9-tetradecenal, (Z)-11-tetradecenal, (E)-11-tetradecenal, (E)-11,13-tetradecadienal, (E,E)-8,10-tetradecadienal, (Z,E)-9,11-tetradecadienal, (Z,E)-9,12-tetradecadienal, hexadecanal, (Z)-8-hexadecenal, (Z)-9-hexadecenal, (Z)-10-hexadecenal, (E)-10-hexadecenal, (Z)-11-hexadecenal, (E)-hexadecenal, (Z)-12-hexadecenal, (Z)-13-hexadecenal, (Z)-14-methyl-8-hexadecenal, (E)-14-methyl-8-hexadecenal, (Z,Z)-7,11-hexadecadienal, (Z,E)-7,11-hexadecadienal, (Z,E)-9,11-hexadecadienal, (E,E)-10,12-hexadecadienal, (E,Z)-10,12-hexadecadienal, (Z,E)-10,12-hexadecadienal, (Z,Z)-10,12-hexadecadienal, (Z,Z)-11, 13-hexadecadienal, octadecenal, (Z)-11-octadecenal, (E)-13-octadecenal, (Z)-13-octadecenal, (Z)-5-decenyl 3-methylbutanoate and (+)cis-7,8-epoxy-2-methyloctadecane.

Insecticide is selected from abamectin, AC 303 630, acephate, acrinathrin, alanycarb, aldicarb, alphamethrin, amitraz, avermectin, AZ 60541, azadirachtin, azinphos A, azinphos M, azocyclotin, *Bacillus thuringiensis*, bendiocarb, benfuracarb, bensultap, betacyfluthrin, bifenthrin, bioresmethrin, BPMC, brofenprox, bromophos A, bufencarb, buprofezin, butocarboxin, butylpyridaben, cadusafos, carbaryl, carbofuran, carbophenothion, carbosulfan, cartap, CGA 157 419, CGA 184699, chloethocarb, chlorethoxyfos, chlorfenvinphos, chlorfluazuron, chlormephos, chlorpyrifos, chlorpyrifos M, cis-Resmethrin, clocythrin, clofentezine, cyanophos, cycloprothrin, cyfluthrin, cyhalothrin, cyhexatin, cypermethrin, cyromazine, deltamethrin, demeton M, demeton S, demeton-S-methyl, diafenthiuron, diazinon, dichlofenthion, dichlorvos, dicliphos, dicrotophos, diethion, diflubenzuron, dimethoate, dimethylvinphos, dioxathion, disulfoton, edifenphos, emamectin, esfenvalerate, ethiofencarb, ethion, ethofenprox, ethoprophos, etrimphos, fenamiphos, fenazaquin, fenbutatin oxide, fenitrothion, fenobucarb, fenothiocarb, fenoxycarb, fenpropathrin, fenpyrad, fenpyroximate, fenthion, fenvalerate, fipronil, fluazinam, flucycloxuron, flucythrinate, flufenoxuron, flufenprox, fluvalinate, fonophos, formothion, fosthiazate, fubfenprox, furathiocarb, HCH, heptenophos, hexaflumuron, hexythiazox, imidacloprid, iprobenfos, isazophos, isofenphos, isoprocarb, isoxathion, ivermectin, lambda-cyhalothrin, lufenuron, malathion, mecarbam, mervinphos, mesulfenphos, metaldehyde, methacrifos, methamidophos, methidathion, methiocarb, methomyl, metolcarb, milbemectin, monocrotophos, moxidectin, naled, NC 184, NI 25, nitenpyram omethoat, oxamyl, oxydemethon M, oxydeprofos, parathion A, parathion M, permethrin, phenothrin, phenthoate, phorate, phosalone, phosmet, phosphamidon, phoxim, pirimicarb, pirimiphos M, pirimiphos A, profenofos, promecarb, propaphos, propoxur, prothiofos, prothoate, pymetrozin, pyrachlophos, pyridaphenthion, pyresmethrin, pyrethrum, pyridaben, pyrimidifen, pyriproxifen, quinalphos, resmethrin, RH 5992, salithion, sebufos, silafluofen, sulfotep, sulprofos, tebufenozid, tebufenpyrad, tebupirimiphos, teflubenzuron, tefluthrin, temephos, terbam, terbufos, tetrachlorvinphos, thiafenox, thiodicarb, thiofanox, thiomethon, thionazin, thuringiensin, tralocytrin, tralomethrin, triarathen, triazophos, triazuron, trichlorfon, triflumuron, trimethacarb, transfluthrin vamidothion, XMC, xylylcarb, zetamethrin.

While the invention has been described with reference to preferred embodiments, it will be understood that the invention may take various forms or may be accomplished in a variety of manners that will accomplish the described invention and are contemplated to be within the scope of the invention as claimed herein. Such modifications may include substituting elements or components which perform substantially the same function in substantially the same way to achieve substantially the same result that the invention can be practiced with modification within the scope of the following claims.

What is claimed:

1. A mountable multi-component substantially two-mensional device for assembly into a three-dimensional device comprising:

a) a housing component having a flat configuration before assembly and a three-dimensional configuration when assembled, said housing component comprising of a main panel having an inner and an outer side;
   a first side panel having an inner and an outer side;
   a first tab panel having an inner and an outer side;
   a second side panel having an inner and an outer side;
   a second tab panel having an inner and an outer side;
   wherein said main panel is positioned between said first and second side panels and said tab panels are each separated from the main panel by said side panels, and wherein the inner sides of all panels are facing in the same direction toward a surface where the device is to be mounted and wherein the outer sides of all panels are facing in the same direction away from the surface where the device is to be mounted;
   said two side panels separating said main panel from said tab panels such that when deployed in the three-dimensional configuration, said two side panels are projected upwardly and form sides of the three-dimensional configuration wherein said first tab panel and said second tab panel are positioned parallel to the first and second side panels and wherein in the three-dimensional configuration said tab panels are projected outwardly respective to the main panel;
   said inner sides of said tab panels further comprising an adhesive surface for mounting and attachment of the assembled housing component in a fixed position to the surface where the device is to be mounted, said adhesive surface placed on the inner side of the outwardly projecting first and second tab panels, wherein in the assembled three-dimensional configuration, said adhesive surface is affixed to the surface where the device is to be mounted;
   wherein in the affixed assembled three-dimensional configuration, said mounted housing component comprising said main panel and two side panels, and the surface of the place where the housing is attached form two openings on opposite sides of the affixed assembled three-dimensional configuration;
   said assembled mounted housing component and said surface where the device is to be mounted forming an inner cavity within the housing when the housing is assembled into the three-dimensional configuration and affixed to the surface where the device is to be mounted, said inner cavity having a means for receiving an insert which closely fits into said inner cavity of the housing and wherein said housing has further a means for holding said insert component within said cavity; and b) an insert component which fits closely into said inner cavity of said housing, said insert component having a two-dimensional configuration before assembly and a three-dimensional configuration after assembly;
   said insert comprising
   a top panel having an inner and an outer side;
   a side panel having an inner and an outer side; and
   a bottom panel having an inner and an outer side;
   said side panel positioned between the top and bottom panels and both the top and the side panels are connected with the side panel by fold lines permitting assembly of the insert from two dimensional to the three-dimensional configuration;
   wherein when assembled in three-dimensional configuration, the top inner side of the top panel and the bottom inner side of the bottom panel substantially face each other and the bottom outer side of the bottom panel of the insert is positioned in close proximity of the inner side of the main panel and the outer side of the top panel of the insert is positioned in close proximity of the surface where the housing is attached; and wherein the top inner side, the bottom inner side, or both, is coated with an adhesive coating;

wherein when assembled in the three-dimensional configuration said insert has two side openings corresponding to said two openings on the opposite sides of the three-dimensional configuration of the mounted housing;

wherein when the device is assembled and deployed in the three-dimensional configuration, the insert is positioned within said inner cavity of said mounted housing and said two openings in the housing and in the insert are continuous and corresponding to each other and wherein said insert is held in the inner cavity of the housing by said holding means.

2. The device of claim 1 wherein said holding means for said insert within said inner cavity is a detent.

3. The device of claim 2 wherein said housing is permanently affixed to the surface where the device is deployed.

4. The device of claim 3 wherein said insert is removable and disposable.

5. The device of claim 4 wherein said insert further comprises a tab, a hole, a slit or a holding means for holding a dispenser.

6. The device of claim 5 wherein said dispenser is a container.

7. The device of claim 6 wherein the dispenser is made of a chemically neutral material selected from the group consisting of polymer, rubber, elastomer, cellulose, wood and felt.

8. The device of claim 7 wherein said dispenser is a rubber septa, a polymer stopper, a cellulose strip or a wooden structure.

9. The device of claim 8 wherein said dispenser dispenses an attractant or a repellant at a controlled release rate.

10. The device of claim 5 wherein said dispenser is the adhesive surface containing an attractant or a repellant.

11. The device of claim 9 wherein said device is an insect trap.

12. The device of claim 10 wherein said device is an insect trap.

* * * * *